(12) United States Patent
Reighley et al.

(10) Patent No.: US 8,703,269 B2
(45) Date of Patent: Apr. 22, 2014

(54) REINFORCED COMPOSITE STRUCTURES FOR AIRCRAFTS AND METHODS FOR MAKING THE SAME

(75) Inventors: John Everett Reighley, Clyo, GA (US); David Charles Hornick, Midway, GA (US); Andrew Foose, Savannah, GA (US); Charles Owen Aitken, Pooler, GA (US); Kevin Andrew Shea, Port Wentworth, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 155 days.

(21) Appl. No.: 13/396,325

(22) Filed: Feb. 14, 2012

(65) Prior Publication Data

US 2013/0209746 A1 Aug. 15, 2013

(51) Int. Cl.
*E04C 3/38* (2006.01)

(52) U.S. Cl.
USPC ......... 428/119; 244/132; 244/131; 244/123.8

(58) Field of Classification Search
USPC .......... 428/119; 244/132, 131, 123.8; 52/841, 52/837
See application file for complete search history.

(56) References Cited

U.S. PATENT DOCUMENTS

| | | | |
|---|---|---|---|
| 2,617,179 A | 10/1952 | Burke | |
| 4,606,961 A | 8/1986 | Munsen et al. | |
| 7,897,004 B2 | 3/2011 | Engwall et al. | |
| 2006/0243860 A1 | 11/2006 | Kismarton | |
| 2008/0072527 A1* | 3/2008 | Kondo et al. | ................ 52/729.1 |
| 2008/0103740 A1 | 5/2008 | Meizoso Latova et al. | |
| 2008/0302915 A1 | 12/2008 | Yip et al. | |
| 2009/0317587 A1 | 12/2009 | Deobald et al. | |
| 2009/0320292 A1 | 12/2009 | Brennan et al. | |
| 2010/0243803 A1 | 9/2010 | Westre et al. | |
| 2011/0088833 A1 | 4/2011 | Guzman et al. | |
| 2011/0284693 A1 | 11/2011 | Barnard et al. | |
| 2011/0315824 A1 | 12/2011 | Pook et al. | |

OTHER PUBLICATIONS

International Searching Authority, International Search Report and Written Opinion mailed Dec. 23, 2013 for PCT International Application No. PCT/US13/25154.

* cited by examiner

*Primary Examiner* — Alexander Thomas
(74) *Attorney, Agent, or Firm* — Ingrassia, Fisher & Lorenz, P.C.

(57) ABSTRACT

Embodiments of reinforced composite structures for aircrafts and methods for making such reinforced composite structures are provided herein. A reinforced composite structure for an aircraft comprises a fiber reinforced composite stringer. The fiber reinforced composite stringer comprises a beam body portion and a runout portion that extends from the beam body portion in a first direction. The beam body and runout portions are defined by projection of a variable I-shaped cross-section in the first direction along at least a portion of an entire combined length of the beam body and runout portions. The variable I-shaped cross-section has a cap section, a foot section, and a web section that extends between the cap and foot sections. The variable I-shaped cross-section is configured such that a height of the web section tapers in the first direction along at least a portion of an entire length of the runout portion.

19 Claims, 6 Drawing Sheets

REINFORCED COMPOSITE STRUCTURES FOR AIRCRAFTS AND METHODS FOR MAKING THE SAME

TECHNICAL FIELD

The present invention relates generally to reinforced structures and methods for making reinforced structures, and more particularly relates to reinforced composite structures for an aircraft, such as fiber reinforced composite stringers and fiber reinforced composite skins affixed to fiber reinforced composite stringers, and methods for making such reinforced composite structures.

BACKGROUND

The fuselage, wings, and empennage of an aircraft typically include stringers that are coupled to skin that forms the smooth aerodynamic outer surfaces of the fuselage, wings, and empennage. The stringers and skin cooperate to provide flexural and torsional stiffness to these sections of the aircraft. Traditionally, the fuselage, wings, and empennage surfaces and the associated stringers are fabricated from metal, such as aluminum, steel, or titanium. The stringer may include a web portion, such as a planar wall, that is generally oriented in a direction approximately perpendicular to the skin and extends in a generally lengthwise direction along the fuselage and empennage and in a generally spanwise direction along the wing so that the web portion provides resistance to bending. A flange portion may be positioned on one or both of the longitudinal edges of the web portion to provide increased rigidity and support to the stringer. The flange portion along one of the longitudinal edges of the web portion can also be used as an attachment surface for attaching the stringer to the skin.

Fiber reinforced composite materials are widely used in a variety of commercial and military aircraft products as a substitute for metals, particularly in applications where relatively low weight and high mechanical strength are desired. The material is generally comprised of a network of reinforcing fibers that are arranged in layers or plies. The layers include a resin matrix that substantially wets the reinforcing fibers and that is cured to form an intimate bond between the resin and the reinforcing fibers. The composite material may be formed into a structural component by a variety of known forming methods, such as extrusion, vacuum bagging, autoclaving, and/or the like.

As the skins and stringers for various sections of aircrafts transition from metallic materials to fiber reinforced composite materials, multiple issues have arisen. In a current fabrication process, a fiber reinforced composite skin is formed by stacking layers together that contain reinforcing fibers in a resin matrix. Typically, some of the layers are staggered relative to each other so that the stack conforms to a desired contoured or tapered geometry. The stacked layers are heated and pressurized to cure the polymeric resin matrix and form a precured skin. Hard tooling, e.g., metallic tooling or metallic mold/die, containing an uncured fiber reinforced composite material that is shaped or preformed into a stringer is positioned along the precured skin. Pressure and heat are applied to cure the stringer preform using the hard tooling to form a fiber reinforced composite stringer that is attached to the precured skin. Unfortunately, defects often occur along the interface between the precured skin and the fiber reinforced composite stringer. In particular, the precured skin typically has a contoured outer surface that includes small steps or drop-offs that are formed by the staggered, stacked layers of fibers and polymer resin. As such, it is difficult to match and position the hard tooling to continuously follow the outer surface of the precured skin and the hard tooling will often bridge across these sections of the precured skin forming under compressed areas, e.g., voids, and over compressed areas, e.g., resin poor areas, at the interface between the precured skin and the fiber reinforced composite stringer. These under and over compressed areas can reduce the load transfer efficacy between the precured skin and the fiber reinforced composite stringer, thereby reducing the rigidity and support provided by the fiber reinforced composite stringer. Moreover, fiber reinforced composite stringers formed by this fabrication process or similar fabrication processes typically have a flange portion positioned along only one of the longitudinal edges of the web portion, particularly in the runout or end portions of the stringer, because it is difficult to remove the hard tooling from the fiber reinforced composite stringer after curing. As such, the rigidity and support of the fiber reinforced composite stringer is further compromised.

Accordingly, it is desirable to provide reinforced composite structures for an aircraft including fiber reinforced composite stringers and, optionally, fiber reinforced composite skins affixed to the fiber reinforced composite stringers that provide improved flexural and torsional stiffness, and methods for making such reinforced composite structures. Furthermore, other desirable features and characteristics of the present invention will become apparent from the subsequent detailed description and the appended claims, taken in conjunction with the accompanying drawings and this background.

BRIEF SUMMARY

Reinforced composite structures for aircrafts and methods for making such reinforced composite structures are provided herein. In accordance with an exemplary embodiment, a reinforced composite structure for an aircraft comprises a fiber reinforced composite stringer. The fiber reinforced composite stringer comprises a beam body portion and a runout portion that extends from the beam body portion in a first direction. The beam body and runout portions are defined by projection of a variable I-shaped cross-section in the first direction along at least a portion of an entire combined length of the beam body and runout portions. The variable I-shaped cross-section has a cap section, a foot section, and a web section that extends between the cap and foot sections. The variable I-shaped cross-section is configured such that a height of the web section tapers in the first direction along at least a portion of an entire length of the runout portion.

In accordance with another exemplary embodiment, a reinforced composite structure for an aircraft comprises a fiber reinforced composite stringer. The fiber reinforced composite stringer comprises a beam body portion and a runout portion that extends from the beam body portion in a first direction. The beam body and runout portions are defined by projection of a variable I-shaped cross-section in the first direction along at least a portion of an entire combined length of the beam body and runout portions. The variable I-shaped cross-section has a cap section, a foot section, and a web section that extends between the cap and foot sections. The variable I-shaped cross-section is configured such that a height and a width of the web section tapers and flares, respectively, in the first direction along at least a portion of an entire length of the runout portion to merge the cap section with the foot section. A skin structure is affixed to the fiber reinforced composite stringer along the foot section.

In accordance with another exemplary embodiment, a method for making a reinforced composite structure for an aircraft is provided. The method comprises the steps of arranging a prepreg layup along a cavity formed in an elastomeric mold to form a prepreg-preform stringer. The prepreg-preform stringer is positioned with the elastomeric mold on a skin structure. The prepreg-preform stringer is heated and pressurized using the elastomeric mold to cure the prepreg-preform stringer and form a fiber reinforced composite stringer affixed to the skin structure.

BRIEF DESCRIPTION OF THE DRAWINGS

The present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding background or the following detailed description.

Various embodiments contemplated herein relate to reinforced composite structures for an aircraft including fiber reinforced composite stringers, optionally including fiber reinforced composite skins affixed to the fiber reinforced composite stringers, and methods for making such reinforced composite structures. Unlike the prior art, the exemplary embodiments of methods taught herein arrange a prepreg layup along a cavity formed in an elastomeric mold, e.g., a silicone mold, to form a prepreg-preform stringer. The prepreg layup is formed of a plurality of prepreg plies that are stacked together and that may be oriented in a predetermined arrangement. As used herein, the term "prepreg ply" refers to a layer of reinforcing fibers pre-impregnated with a resin as is well known in the art. The prepreg plies may include layers of unidirectional fiber reinforced prepreg, cloth or woven fiber reinforced prepreg, nonwoven fiber reinforced prepreg, random fiber reinforced prepreg, braided fiber reinforced prepreg, continuous fiber reinforced prepreg, and/or discontinuous fiber reinforced prepreg. Non-limiting examples of reinforcing fibers include S-glass fibers, E-glass fibers, carbon fibers, ceramic fibers, metallic fibers, polymeric fibers, and the like. Non-limiting examples of polymeric resins include epoxies, polyurethanes and/or polyurethane precursors, polyesters and/or polyester precursors, and the like. Other reinforcing fibers and/or polymeric resins known to those skilled in the art of fiber reinforced composite materials may also be used.

In an exemplary embodiment, the cavity of the elastomeric mold has a variable T-shaped cross-section that is projected through a portion of the elastomeric mold. A variable shaped cross-section as used herein is understood to mean that the dimensions, e.g., height, thickness, and/or width, of the cross-section can vary along a length of projection. The variable T-shaped cross-section has a cap cavity section and a web cavity section that extends between the cap cavity section and an outer surface of the elastomeric mold. The elastomeric mold is flexible and can be bent to facilitate positioning portions of the prepreg layup in the cap and web cavity sections. In an exemplary embodiment, opposing outermost end portions (e.g. outermost end portions that are disposed opposite of each other) of the prepreg layup extend from the web cavity section to outside the elastomeric mold. The opposing outermost end portions of the prepreg layup are folded over onto adjacent sides of the outer surface of the elastomeric mold. As such, the prepreg-preform stringer has a variable I-shaped cross-section and comprises a preformed cap section, a preformed web section, and a preformed foot section that correspond to the portions of the prepreg layup disposed along the cap cavity section, web cavity section, and the adjacent sides of the outer surface of the elastomeric mold, respectively.

In an exemplary embodiment, the prepreg-preform stringer is positioned with the elastomeric mold on a skin structure. The preform foot portion of the prepreg-preform stringer is arranged directly on the outer surface of the skin structure with the adjacent sides of the outer surface of the elastic mold overlying the preform foot portion. In an exemplary embodiment, the skin structure comprises an uncured fiber reinforced material, such as, for example, a plurality of prepreg plies that are stacked together in a predetermined orientation. In an alternative embodiment, the skin structure comprises a cured fiber reinforced material. Heat and pressure are applied to the skin structure and the prepreg-preform stringer using the elastomeric mold to co-cure the prepreg-preform stringer with the skin structure, forming a fiber reinforced composite stringer that is affixed to the skin structure. The inventors have found that by using an elastomeric mold to position and affix the prepreg-preform stringer to the skin structure, the elastomeric mold readily flexes under pressure to conform to the outer surface of the skin structure, causing the preform foot portion of the prepreg-preform stringer, which is sandwiched between the elastomeric mold and the skin structure, to continuously follow the contours and/or any small steps or drop-offs in the skin structure's outer surface. As such, under compressed or over compressed areas along the interface between the skin structure and the fiber reinforced composite stringer are reduced, minimized, or eliminated.

In an exemplary embodiment, the fiber reinforced composite stringer as discussed above comprises a beam body portion and an end or runout portion that extends from the beam body portion in a first direction. The beam body and runout portions are defined by projection of a variable I-shaped cross-section, e.g., that corresponds to the variable I-shaped cross-section of the prepreg-preform stringer, in the first direction along at least a portion of an entire combined length of the beam body and runout portions. The variable I-shaped cross-section has a cap section, a foot section, and a web section that extends between the cap and foot sections. The cap, foot, and web sections correspond to the preform cap, preform foot, and preform web sections of the prepreg-preform stringer, respectively. In an exemplary embodiment, the variable I-shaped cross-section is configured such that a height of the web section tapers in the first direction along at least part of an entire length of the runout portion to merge the cap section with the foot section. Notably, the cap and foot sections are configured as flange portions that are position along two opposing longitudinal edges of the web portion. As such, the cap and foot sections extend continuously along the beam body and runout portions to improve the rigidity and support of the fiber reinforced composite stringer. In an exemplary embodiment, the variable I-shaped cross-section is also configured such that a width of the web section flares in the first direction along at least part of the entire length of the runout portion and defines a "wedge-like" shape. The inventors have found that by forming the runout portion in which the web section includes the "wedge-like" shape, the elastomeric mold can be readily bent around the cap section to facilitate removing the elastomeric mold from the fiber reinforced composite stringer.

Figure 1:
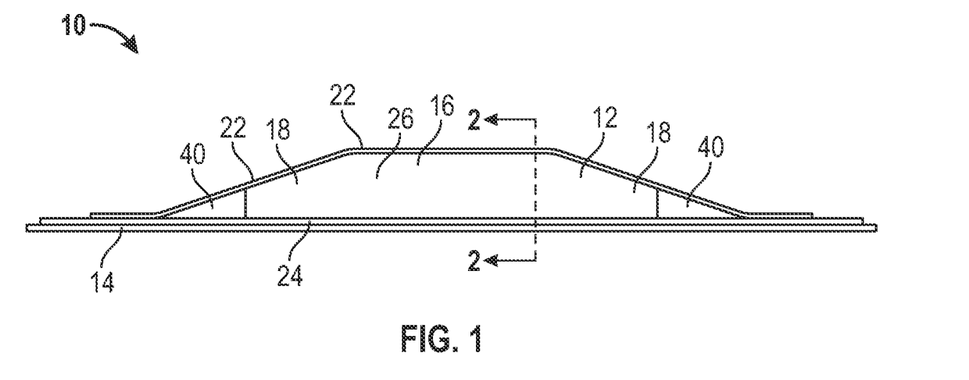
FIG. 1 is a side view of a reinforced composite structure for a representative aircraft in accordance with an exemplary embodiment.
Figure 2:
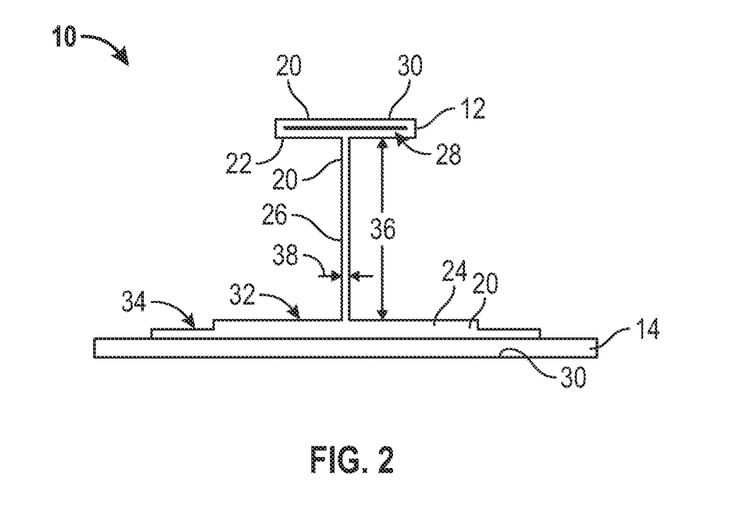
FIG. 2 is a sectional view of the reinforce composite structure depicted in FIG. 1.

Referring to FIGS. 1-2, a side view and a sectional view of a reinforced composite structure 10 for an aircraft in accordance with an exemplary embodiment are provided. The reinforced composite structure 10 comprises a fiber reinforced composite stringer 12 and a skin structure 14 that is affixed to the fiber reinforced composite stringer 12. As will be discussed in further detail below, the fiber reinforced composite stringer 12 and the skin structure 14 are each formed of fiber reinforced composite material 30, which is in a cured condition at this stage. As illustrated, in accordance with an exemplary embodiment, the fiber reinforced composite stringer 12 comprises a beam body portion 16 and two runout portions 18 that extend from the beam body portion 16 in opposite directions. The beam body portion 16 and the runout portion 18 are defined by projection of a variable I-shaped cross-section 20 (see the cross-sectional view of the fiber reinforced composite stringer 12 illustrated in FIG. 2) longitudinally along at least a portion of an entire combined length of the beam body and runout portions 16 and 18. Although the skin structure 14 is shown as being relatively flat, it is to be understood that the skin structure 14 may be contoured and include small steps or drop-offs and that the fiber reinforced composite stringer 12 generally follows the contours of the skin structure 14. Accordingly, the direction and length that the variable I-shaped cross-section 20 is projected to define the fiber reinforced composite stringer 12 can be linear, non-linear, or combinations of linear and non-linear so that the fiber reinforced composite stringer 12 can generally follow the contours of the skin structure 14.

The variable I-shaped cross-section 20 has a cap section 22, a foot section 24, and a web section 26 that extends between the cap and foot sections 22 and 24. As will be discussed in further detail below, the fiber reinforced composite stringer 12 comprises a pre-cured cap insert 28 disposed in the cap section 22 of the beam body and runout portions 16 and 18, with the fiber reinforced composite material 30 of the cap section 22 covering the pre-cured cap insert 28. The foot section 24 is affixed to the skin structure 14 and, as illustrated, can have a first step portion 32 and a second step portion 34 for transitioning to the skin structure 14.

Figure 3:
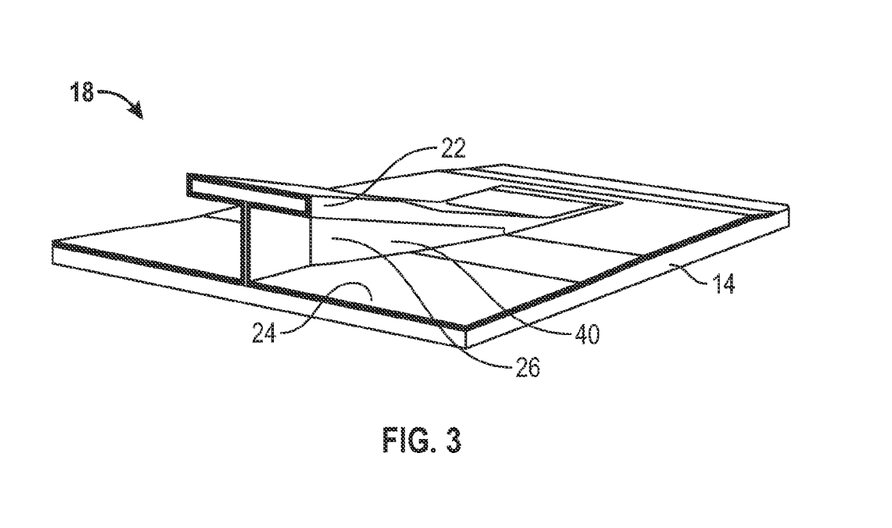
FIG. 3 is a partial perspective view of a runout portion of a reinforced composite structure in accordance with an exemplary embodiment.
Figure 4A:
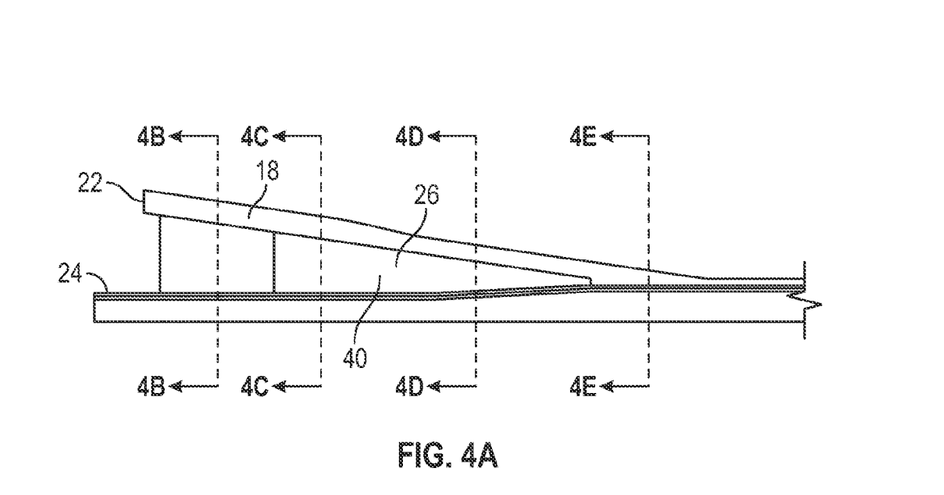
FIG. 4A is a side view of the runout portion depicted in FIG. 3.
Figure 4B:
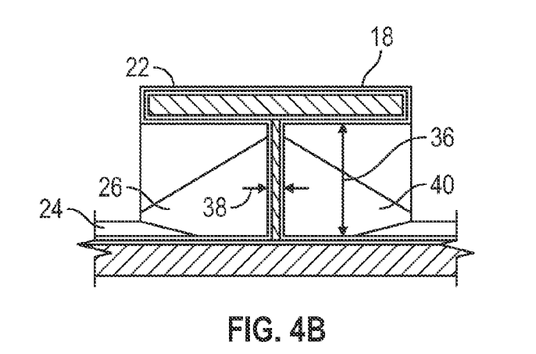
FIGS. 4B-4E are sectional views of the runout portion depicted in FIG. 4A.
Figure 4C:
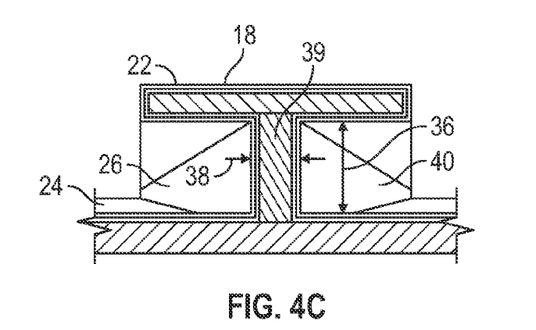
Figure 4D:
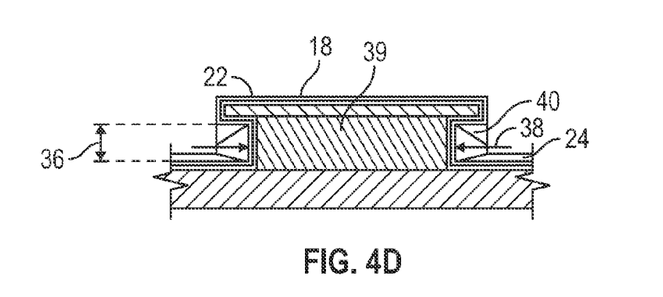
Figure 4E:
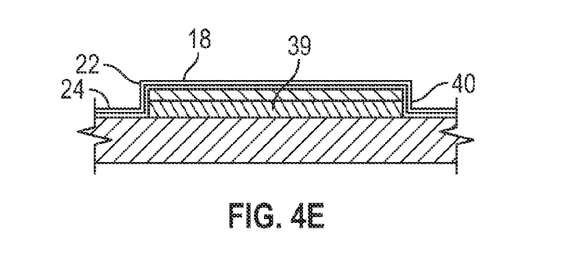

Referring also to FIGS. 3-4E, the web section 26 has a height indicated by double headed arrow 36 and a width indicated by opposing single headed arrows 38. In an exemplary embodiment, the portions of the web section 26 that extend along the runout portions 18 each include a "wedge-like" shape 40. In particular, the variable I-shaped cross-section is configured such that the height (indicated by double headed arrow 36) and width (indicated by opposing single headed arrows 38) of the web section 26 tapers and flares, respectively, distally along a length of the corresponding runout portion 18 to merge the cap section 22 with the foot section 24. In an exemplary embodiment, each of the runout portions 18 comprises a web wedge insert 39 (e.g. wedge shaped insert) that is disposed in the web section 26 of the runout portion 18 extending longitudinally long at least a portion of the entire length of the runout portion 18. The fiber reinforced composite material 30 overlies the web wedge insert 39. In this regard, the web wedge insert 39 helps form the "wedge-like" shape 40. The web wedge insert 39 can be made from a relatively rigid, low density material, such as rigid foam, e.g., polymethacrylimide (PMI) rigid foam. One such suitable material is Rohacell® 51 WF, manufactured by Evonik Industries AG headquartered in Darmstadt, Germany. Other relatively rigid, low density materials known to those skilled in the art may also be used to form the web wedge insert 39.

FIGS. 5-10 illustrate methods for making a reinforced composite structure 10 in accordance with various embodiments. The described process steps, procedures, and materials are to be considered only as exemplary embodiments designed to illustrate to one of ordinary skill in the art methods for practicing the invention; the invention is not limited to these exemplary embodiments. Various steps in the manufacture of reinforced composite structures are well known and so, in the interest of brevity, some conventional steps will only be mentioned briefly herein or will be omitted entirely without providing the well-known process details.

Figure 5:
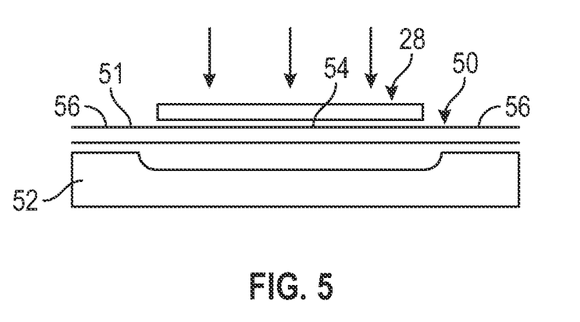
FIGS. 5-9 illustrate a reinforced composite structure in sectional view during stages of its fabrication in accordance with exemplary embodiments.

Referring to FIG. 5, a portion of the reinforced composite structure 10 as discussed above is illustrated at an early stage of fabrication. A plurality of prepreg plies 50 are stacked together to form a prepreg stack 51 that is positioned over a forming tool 52. A pre-cured cap insert 28 is arranged overlying a central portion 54 of the prepreg stack 51 such that opposing end portions 56 of the prepreg stack 51 extend laterally beyond the pre-cured cap insert 28. In an exemplary embodiment, the pre-cured cap insert 28 is configured as an elongated strip and provides a rigid form for helping to shape and handle the prepreg stack 51.

Figure 6:
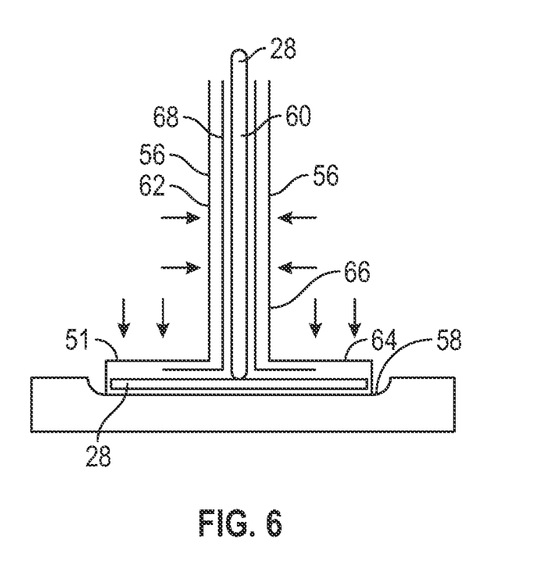

Referring to FIG. 6, the prepreg stack 51 together with the pre-cured cap insert 28 are positioned in a cavity 58 of the forming tool 52. A removable forming insert 60, which is configured as an elongated strip, is position substantially upright along a central portion of the pre-cured cap insert 28 such that an inverted "T-shape" is formed by the pre-cured cap insert 28 and the removable forming insert 60. In an exemplary embodiment, the removable forming insert 60 is formed of a relatively non-stick material, such as polytetrafluoroethylene (PTFE) or the like, so that the prepreg stack 51 does not stick to the removable forming insert 60. The opposing end portions 56 of the prepreg stack 51 are folded over the pre-cured cap insert 28 and along opposite sides of the removable forming insert 60 to form a prepreg layup 62 that has a preformed cap section 64 and a preformed web section 66. In an exemplary embodiment, the web wedge insert(s) 39 (see FIGS. 4B-4E) as discussed above is arranged adjacent to a longitudinal end portion(s) of the pre-cured cap insert 28 (e.g. that corresponds to the location of the runout portion(s) 18) prior to folding, and the opposing end portions 56 of the prepreg stack 51 are also folded over the web wedge insert 39 to form the preformed web section 66. The cavity 58 of the forming tool 52 may be contoured to facilitate folding of the prepreg stack 51 over the pre-cured cap insert 28. If desired, additional prepreg plies 68 may be positioned in the prepreg stack 51 at predetermined locations and/or orientations prior to and/or during folding of the prepreg stack 51.

Figure 7:
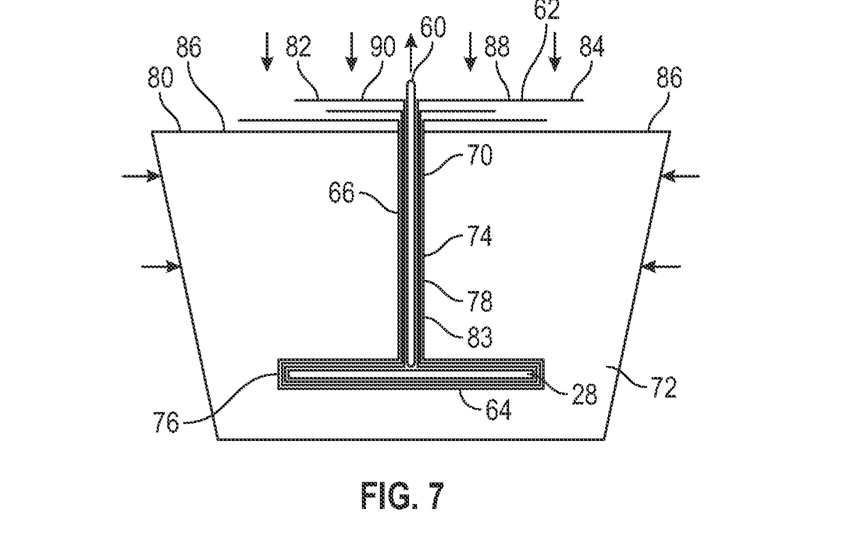

Referring to FIG. 7, the prepreg layup 62 is arranged along a cavity 70 of an elastomeric mold 72. In an exemplary embodiment, the elastomeric mold 72 is formed of an elastomeric material, such as silicone, and has a Shore A durometer hardness of from about 50 to about 70. One such suitable elastomeric material is GT 1364 RTV Silcone manufactured by GT Products, Inc. located in Grapevine, Tex. Other suitable elastomeric materials known to those skilled in the art for forming molds may also be used. In one embodiment, the elastomeric mold 72 is flexible and can be bent, flexed, and/or manipulated to allow access to the cavity 70 even to areas of the elastomeric mold 72 that have significant die lock regions, e.g., undercut areas in the mold that can obstruct part removal from the mold's cavity.

In an exemplary embodiment, the cavity 70 is defined by projection of a variable T-shaped cross-sectional opening 74 longitudinally through the elastomeric mold 72 along a length of the cavity 70. The variable T-shaped cross-sectional opening 74 has a cap cavity section 76 and a web cavity section 78 that extends between the cap cavity section 76 and an outer surface 80 of the elastomeric mold 72. As illustrated, the cap cavity section 76 represents an undercut area or die lock region in the elastomeric mold 72.

In an exemplary embodiment, the prepreg layup 62 is positioned into the elastomeric mold 72 by bending and manipulating portions of the elastomeric mold 72 to progressively expose portions the cap cavity section 76. The preformed cap section 64 is then progressively fed into the exposed portions of the cap cavity section 76. As the exposed portions of the cap cavity section 76 become filled with the preformed cap section 64 of the prepreg layup 62, the bent portions of the elastomeric mold 72 are allowed to relax and return to their original position, capturing the preformed web section 66 of the prepreg layup 62 in the web cavity section 78 of the elastomeric mold 72. Extending from the preformed web section 66 to outside of the elastomeric mold 72 are the first and second outermost end portions 82 and 84 of the prepreg layup 62. In an exemplary embodiment, the first and second outermost end portions 82 and 84 are folded over along the adjacent sides 86 of the outer surface 80 of the elastomeric mold 72 to form a preformed foot section 88 of the prepreg layup 62. As such, the prepreg layup 62 has a variable "I-shape" cross-section 83 formed by the preformed cap section 64, the preformed web section 66, and the preformed foot section 88 to define a prepreg-preform stringer 90. The removable forming insert 60 is then removed from the prepreg layup 62.

Figure 8:
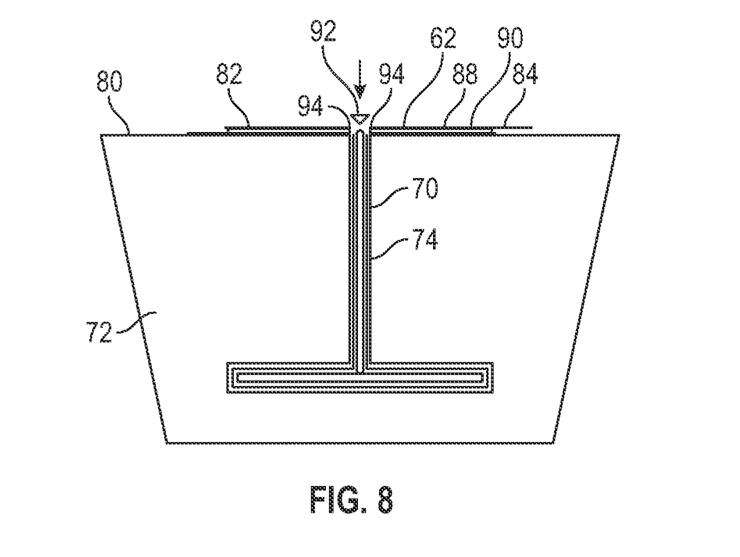

Referring to FIG. 8, in an exemplary embodiment, a radius filler 92 is disposed between the skin structure 14 and the foot section 24 of the beam body and runout portions 16 and 18. More specifically, the radius filler 92 may be positioned along a longitudinal space that is formed between a bend radii 94 of the first and second outermost end portions 82 and 84 of the prepreg layup 62. In an exemplary embodiment, the radius filler 92 is made of a curable polymeric material that may be reinforced with fibers and/or fillers, or alternatively, may not include any reinforcing material. In the un-cured state, the radius filler 92 may be configured as a flexible elongated body or flexible rod. The radius filler 92 helps prevent any defects that might otherwise subsequently form along the interface between the skin structure 14 and the fiber reinforced composite stringer 12 from the presence of the longitudinal space formed between the bend radii 94.

Figure 9:
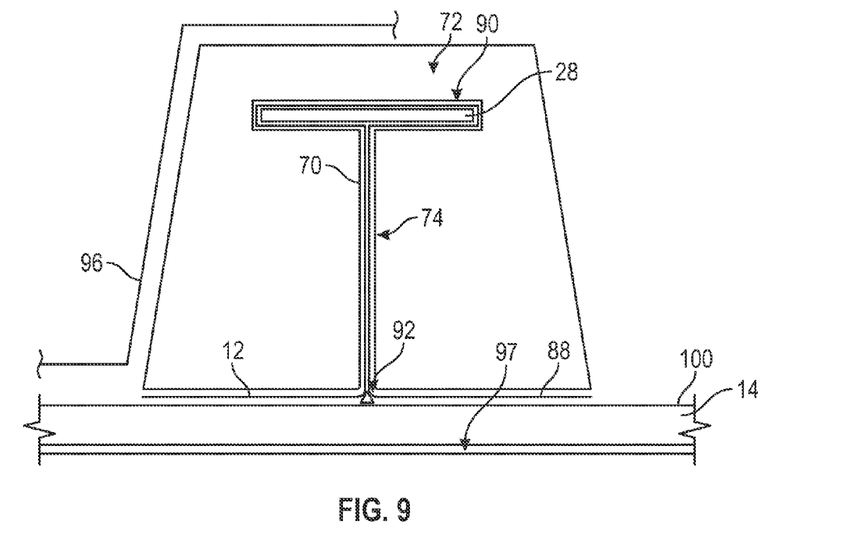

Referring to FIG. 9, the prepreg-preform stringer 90, together with the elastomeric mold 72, are positioned on the skin structure 14 such that the preformed foot section 88 is adjacent to the skin structure 14. In an exemplary embodiment, the skin structure 14 comprises an uncured fiber reinforced material, such as, for example, a layup of prepreg plies that are impregnated with a resin. Although the present embodiment describes the skin structure 14 as comprising an uncured fiber reinforced material, it is to be understood that in alternative embodiments the skin structure 14 can comprise a cured fiber reinforced material. As illustrated, a vacuum bag arrangement 96 is arranged over the skin structure 14 and the elastomeric mold 72 with the prepreg-preform stringer 90 sandwiched between the skin structure 14 and the elastomeric mold 72. A support 97 is positioned under the skin structure 14. Heat and pressure are applied to co-cure the prepreg-preform stringer 90 and the skin structure 14 to form the fiber reinforced composite stringer 12 affixed to the skin structure 14 as discussed above. Well known processes and conditions for applying heat and pressure to uncured fiber reinforced materials, such as using an autoclave in combination with the vacuum bag arrangement 96, may be used to co-cure the prepreg-preform stringer 90 and the skin structure 14. The inventors have found that the elastomeric mold 72 flexes under pressure to conform to the outer surface 100 of the skin structure 14, causing the preform foot section 88 of the prepreg-preform stringer 90, which is sandwiched between the elastomeric mold 72 and the skin structure 14, to continuously follow the contours and any small steps or drop-offs of the skin structure's outer surface 100. As such, under compressed or over compressed areas along the interface between the skin structure 14 and the fiber reinforced composite stringer 12 are reduced, minimized, or eliminated.

Also referring to FIGS. 1 and 3-4E, in an exemplary embodiment, the elastomeric mold 72 is removed from the fiber reinforced composite stringer 12 by bending and manipulating portions of the elastomeric mold 72 to progressively release the cap section 22 of the fiber reinforced composite stringer 12 from the cap cavity section 76, which forms a die lock region of the elastomeric mold 72. Additionally, the inventors have found that by forming the runout portion 18 of the fiber reinforced composite stringer 12 such that the web section 26 includes the "wedge-like" shape 40, the elastomeric mold 72 can be readily bent around the cap section 22 along the runout portion 18 to facilitate removing the elastomeric mold 72 from the fiber reinforced composite stringer 12. Without being limited by theory, it is believed that the "wedge-like" shape 40 helps to reduce the undercut condition in the cap cavity section 76 of the elastomeric mold 72, particularly in the problematic areas corresponding to the runout portion 18, to facilitate removing the elastomeric mold 72 from the fiber reinforced composite stringer 12.

Figure 10:
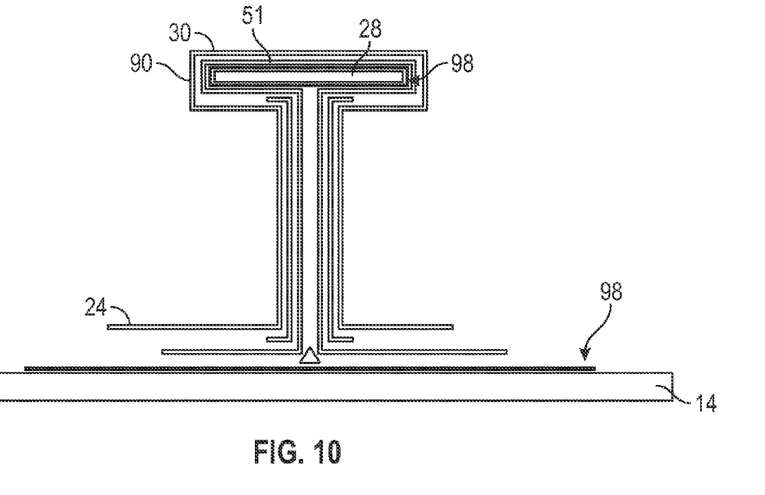
FIG. 10 is a partially exploded sectional view of a reinforced composite structure in accordance with an exemplary embodiment.

Referring to FIG. 10, in a modified exemplary embodiment, a film adhesive 98 may also be arranged between the pre-cured cap insert 28 and the fiber reinforced composite material 30 before folding the prepreg stack 51 over the pre-cured cap insert 28, and/or between the skin structure 14 and the foot section 24 before co-curing the prepreg-preform stringer 90 and the skin structure 14. The film adhesive 98 may comprise a curable polymeric resin and helps improve adhesion strength.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A reinforced composite structure for an aircraft, the reinforced composite structure comprising:
    a fiber reinforced composite stringer comprising a beam body portion and a runout portion that extends from the beam body portion in a first direction, wherein the beam body and runout portions are defined by projection of a variable I-shaped cross-section in the first direction along at least a portion of an entire combined length of the beam body and runout portions, wherein the variable I-shaped cross-section has a cap section, a foot section, and a web section that extends between the cap and foot sections, and wherein the variable I-shaped cross-section is configured such that a height of the web section tapers in the first direction along at least a portion of an entire length of the runout portion, wherein the variable I-shaped cross-section is configured such that a width of the web section flares in the first direction along the at least the portion of the entire length of the runout portion.

2. The reinforced composite structure of claim 1, further comprising a web wedge insert that is disposed in the web section of the runout portion and a cured fiber reinforced composite material that overlies the web wedge insert.

3. The reinforced composite structure of claim 1, further comprising a pre-cured cap insert that is disposed in the cap section of the beam body and runout portions and a cured fiber reinforced composite material that covers the pre-cured cap insert.

4. The reinforced composite structure of claim 3, further comprising a film adhesive disposed between the pre-cured cap insert and the cured fiber reinforced composite material.

5. A reinforced composite structure for an aircraft, the reinforced composite structure comprising:
    a fiber reinforced composite stringer comprising a beam body portion and a runout portion that extends from the beam body portion in a first direction, wherein the beam body and runout portions are defined by projection of a variable I-shaped cross-section in the first direction along at least a portion of an entire combined length of the beam body and runout portions, wherein the variable I-shaped cross-section has a cap section, a foot section, and a web section that extends between the cap and foot sections, and wherein the variable I-shaped cross-section is configured such that a height of the web section tapers in the first direction along at least a portion of an entire length of the runout portion, wherein the cap section merges with the foot section along the at least the portion of the entire length of the runout portion.

6. A reinforced composite structure for an aircraft, the reinforced composite structure comprising:
    a fiber reinforced composite stringer comprising a beam body portion and a runout portion that extends from the beam body portion in a first direction, wherein the beam body and runout portions are defined by projection of a variable I-shaped cross-section in the first direction along at least a portion of an entire combined length of the beam body and runout portions, wherein the variable I-shaped cross-section has a cap section, a foot section, and a web section that extends between the cap and foot sections, and wherein the variable I-shaped cross-section is configured such that a height and a width of the web section tapers and flares, respectively, in the first direction along at least a portion of an entire length of the runout portion to merge the cap section with the foot section; and
    a skin structure affixed to the fiber reinforced composite stringer along the foot section.

7. The reinforced composite structure of claim 6, wherein the skin structure comprises a fiber reinforced composite material.

8. The reinforced composite structure of claim 6, further comprising a radius filler disposed between the skin structure and the foot section of the beam body and runout portions.

9. A method for making a reinforced composite structure for an aircraft, the method comprising the steps of:
    arranging a prepreg layup along a cavity formed in an elastomeric mold to form a prepreg-preform stringer;
    positioning the prepreg-preform stringer with the elastomeric mold on a skin structure; and
    heating and pressurizing the prepreg-preform stringer using the elastomeric mold to cure the prepreg-preform stringer and form a fiber reinforced composite stringer affixed to the skin structure, wherein the fiber reinforced composite stringer comprises a beam body portion and a runout portion that extends from the beam body portion in a first direction, wherein the beam body and runout portions are defined by projection of a variable I-shaped cross-section in the first direction along at least a portion of an entire combined length of the beam body and runout portions, wherein the variable I-shaped cross-section has a cap section, a foot section, and a web section that extends between the cap and foot sections, and wherein the variable I-shaped cross-section is configured such that a height of the web section tapers in the first direction along at least a portion of an entire length of the runout portion, wherein the cap section merges with the foot section along the at least the portion of the entire length of the runout portion.

10. The method according to claim 9, wherein the step of arranging comprises arranging the prepreg layup in the elastomeric mold that comprises silicone.

11. The method according to claim 9, wherein the step of arranging comprises arranging the prepreg layup in the elastomeric mold that has a shore A durometer hardness of from about 50 to about 70.

12. The method according to claim 9, wherein the step of positioning comprises positioning the prepreg-preform stringer on the skin structure that comprises an uncured fiber reinforced material, and wherein the step of heating and pressurizing comprises heating the skin structure to cure the uncured fiber reinforced material together with the prepreg-preform stringer to affix the skin structure to the fiber reinforced composite stringer.

13. The method according to claim 9, wherein the cavity is defined by projection of a variable T-shaped cross-sectional opening in a first direction through the elastomeric mold along a length of the cavity, wherein the variable T-shaped cross-sectional opening has a cap cavity section and a web cavity section that extends between the cap cavity section and an outer surface of the elastomeric mold, and where the step of arranging comprises bending portions of the elastomeric mold to facilitate positioning the prepreg layup in the cap and web cavity sections.

14. The method according to claim 13, further comprising the steps of:
    stacking a plurality of prepreg plies to form a prepreg stack;
    arranging a pre-cured cap insert overlying a first central portion of the prepreg stack;

folding opposing end portions of the prepreg stack over the pre-cured cap insert to form the prepreg layup having a preformed cap section that includes the pre-cured cap insert, and wherein the step of arranging the prepreg layup comprises bending the portions of the elastomeric mold to facilitate positioning the preformed cap section in the cap cavity section of the elastomeric mold.

15. The method of claim 14, further comprising the step of: positioning a removable forming insert adjacent to a second central portion of the pre-cured cap insert, and wherein the step of folding the opposing end portions comprises folding the opposing end portions of the prepreg stack over the pre-cured cap insert and along opposite sides of the removable forming insert to form the prepreg layup that includes the preformed cap section and a preformed web section, and wherein the step of arranging the prepreg layup comprises bending the portions of the elastomeric mold to facilitate positioning the preformed cap and web sections in the cap and web cavity sections of the elastomeric mold, respectively.

16. The method of claim 15, wherein the step of arranging the prepreg layup comprises positioning the preformed web section in the web cavity section such that a first outermost end portion and a second outermost end portion of the prepreg stack extend from the web cavity section to outside of the elastomeric mold, and wherein the method further comprises the steps of:

folding the first and second outermost end portions along adjacent sides of the outer surface of the elastomeric mold, respectively, to form the prepreg layup that includes a preformed foot section; and removing the removable forming insert from the prepreg layup.

17. The method of claim 16, further comprising the step of: positioning a radius filler along the preformed foot section in a space formed between the first and second outermost end portions prior to the step of positioning the prepreg-preform stringer.

18. The method of claim 15, further comprising the step of: positioning the opposing end portions of the prepreg stack over a web wedge insert to form the preformed web section that includes the web wedge insert.

19. The method of claim 9, wherein the step of heating and pressurizing the prepreg-preform stringer comprises forming the fiber reinforced composite stringer affixed to the skin structure along the foot section.

* * * * *